US011726901B2

(12) United States Patent
Douglas et al.

(10) Patent No.: US 11,726,901 B2
(45) Date of Patent: Aug. 15, 2023

(54) CONTINUOUS TESTING AND DEPENDENCY TRACKING FOR JAVA VIRTUAL MACHINES

(71) Applicant: Red Hat, Inc., Raleigh, NC (US)

(72) Inventors: Stuart Douglas, Orange (AU); Georgios Andrianakis, Attica (GR); Stephane Epardaud, Peille (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/339,343

(22) Filed: Jun. 4, 2021

(65) Prior Publication Data

US 2022/0391309 A1 Dec. 8, 2022

(51) Int. Cl.
G06F 11/36 (2006.01)
G06F 9/455 (2018.01)

(52) U.S. Cl.
CPC ...... G06F 11/3688 (2013.01); G06F 9/45533 (2013.01)

(58) Field of Classification Search
CPC ............... G06F 11/3688; G06F 9/45533
See application file for complete search history.

(56) References Cited

U.S. PATENT DOCUMENTS 10,678,678 B1 * 6/2020 Tsoukalas ........... G06F 11/3664
10,733,087 B2   8/2020 Wiener et al.
2006/0187848 A1 * 8/2006 Zaniolo .................. H04L 43/50
                                                        370/242
2006/0277439 A1 * 12/2006 Davia ................. G06F 11/3676
                                                        714/38.1
2007/0094542 A1 * 4/2007 Bartucca ............. G06F 11/3688
                                                        714/38.1

(Continued)

FOREIGN PATENT DOCUMENTS

CN          104407971 B       4/2017

OTHER PUBLICATIONS

Shi, August et al.; "Understanding and Improving Regression Test Selection in Continuous Integration", pp. 1-11, Department of Computer Science, University of Illinois at Urbana-Champaign, USA, 2019, Retrieved on or before Apr. 3, 2021—11 Pages.

(Continued)

*Primary Examiner* — Wei Y Zhen
*Assistant Examiner* — Brahim Bourzik
(74) *Attorney, Agent, or Firm* — K&L Gates LLP

(57) ABSTRACT

A system includes a processor in communication with a memory, a virtual machine running on the processor, and an application executing within the virtual machine. The virtual machine is associated with at least one testing tool configured to transform a plurality of application classes of the application, such that each respective class of the plurality of application classes is configured to track its respective usage. The testing tool is further configured to test the application with a plurality of tests, and while testing the application, map which respective classes of the plurality of application classes are used by respective tests. Additionally, the testing tool is configured to determine which class(es) is used by which tests (e.g., a subset of tests). Responsive to a first class being modified, the testing tool is configured to retest the application with the subset of tests.

20 Claims, 6 Drawing Sheets

(56) References Cited

U.S. PATENT DOCUMENTS

| | | | |
|---|---|---|---|
| 2007/0214391 A1* | 9/2007 | Castro | G06F 11/368 |
| | | | 714/38.14 |
| 2009/0106597 A1* | 4/2009 | Branca | G06F 11/3688 |
| | | | 714/38.1 |
| 2011/0089232 A1* | 4/2011 | Kekicheff | G06F 11/36 |
| | | | 715/764 |
| 2017/0235661 A1* | 8/2017 | Liu | G06F 11/3688 |
| | | | 717/106 |
| 2019/0171550 A1 | 6/2019 | Eizenman et al. | |
| 2020/0125485 A1* | 4/2020 | Wiener | G06F 11/3664 |

OTHER PUBLICATIONS

Normann, Filip; "Test Case Selection Based on Code Changes", Nov. 2019, pp. 1-28, Uppsala Universitet, Department of Information Technology—28 Pages.

Campos, José et al, "Continuous Test Generation: Enhancing Continuous Integration with Automated Test Generation", Department of Computer Science, University of Sheffield; Certus Software V&V Simula Research Laboratory; Faculty of Engineering, University of Porto, Sep. 15-19, 2014, Västerås, Sweden, ACM 978-1-4503-3013-Aug. 14, 2019—12 Pages.

Xu, Zhihong et al.; "Directed Test Suite Augmentation: Techniques and Tradeoffs", pp. 1-10 Department of Computer Science and Engineering, Computer Science Department Korea Advanced Institute of Science and Technology, Nov. 7-11, 2010, Santa Fe, New Mexico, USA, ACM 978-1-60558-791—Feb. 10, 2011—10 Pages.

\* cited by examiner

US 11,726,901 B2

CONTINUOUS TESTING AND DEPENDENCY TRACKING FOR JAVA VIRTUAL MACHINES

BACKGROUND

Computer systems may run applications or services that are provided via a server or cloud. The applications or services can be developed and deployed as commercial or enterprise offerings. As part of the development process, where the applications or services are deployed either as a single unit or as multiple units, the application may be subjected to various tests prior to deployment.

SUMMARY

The present disclosure provides new and innovative systems and methods for performing continuous testing and dependency tracking for virtual machines, and more specifically for Java virtual machines ("JVMs"). In an example, a system includes a processor in communication with a memory, a virtual machine running on the processor, and an application executing within the virtual machine. The virtual machine is associated with at least one testing tool configured to transform a plurality of application classes of the application, such that each respective class of the plurality of application classes is configured to track usage of the respective class. The testing tool is further configured to test the application with a plurality of tests, and while testing the application, map which respective classes of the plurality of application classes are used by respective tests of the plurality of tests. Additionally, the testing tool is configured to determine that a first class of the plurality of application classes is used by a subset of tests of the plurality of tests. The subset of tests may include a first test and a second test of the plurality of tests. Responsive to the first class of the plurality of application classes being modified, the testing tool is configured to retest the application with the subset of tests based on determining that the first class is used by the subset of tests.

In an example, a method includes transforming a plurality of application classes of an application, such that each respective class of the plurality of application classes is configured to track usage of the respective class. The method also includes testing the application with a plurality of tests and while testing the application and mapping which respective classes of the plurality of application classes are used by respective tests of the plurality of tests. Additionally, the method includes determining that a first class of the plurality of application classes is used by a subset of tests of the plurality of tests. In an example, the subset of tests includes a first test and a second test of the plurality of tests. Responsive to the first class of the plurality of application classes being modified, the method includes retesting the application with the subset of tests based on determining that the first class is used by the subset of tests.

In an example, a non-transitory machine-readable medium stores code, which when executed by a processor is configured to transform a plurality of application classes of an application, such that each respective class of the plurality of application classes is configured to track usage of the respective class. The non-transitory machine-readable medium is also configured to test the application with a plurality of tests and while testing the application, map which respective classes of the plurality of application classes are used by respective tests of the plurality of tests. Furthermore, the non-transitory machine-readable medium is configured to determine that a first class of the plurality of application classes is used by a subset of tests of the plurality of tests. In an example, the subset of tests includes a first test and a second test of the plurality of tests. Responsive to the first class of the plurality of application classes being modified, the non-transitory machine-readable medium is configured to retest the application with the subset of tests based on determining that the first class is used by the subset of tests.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
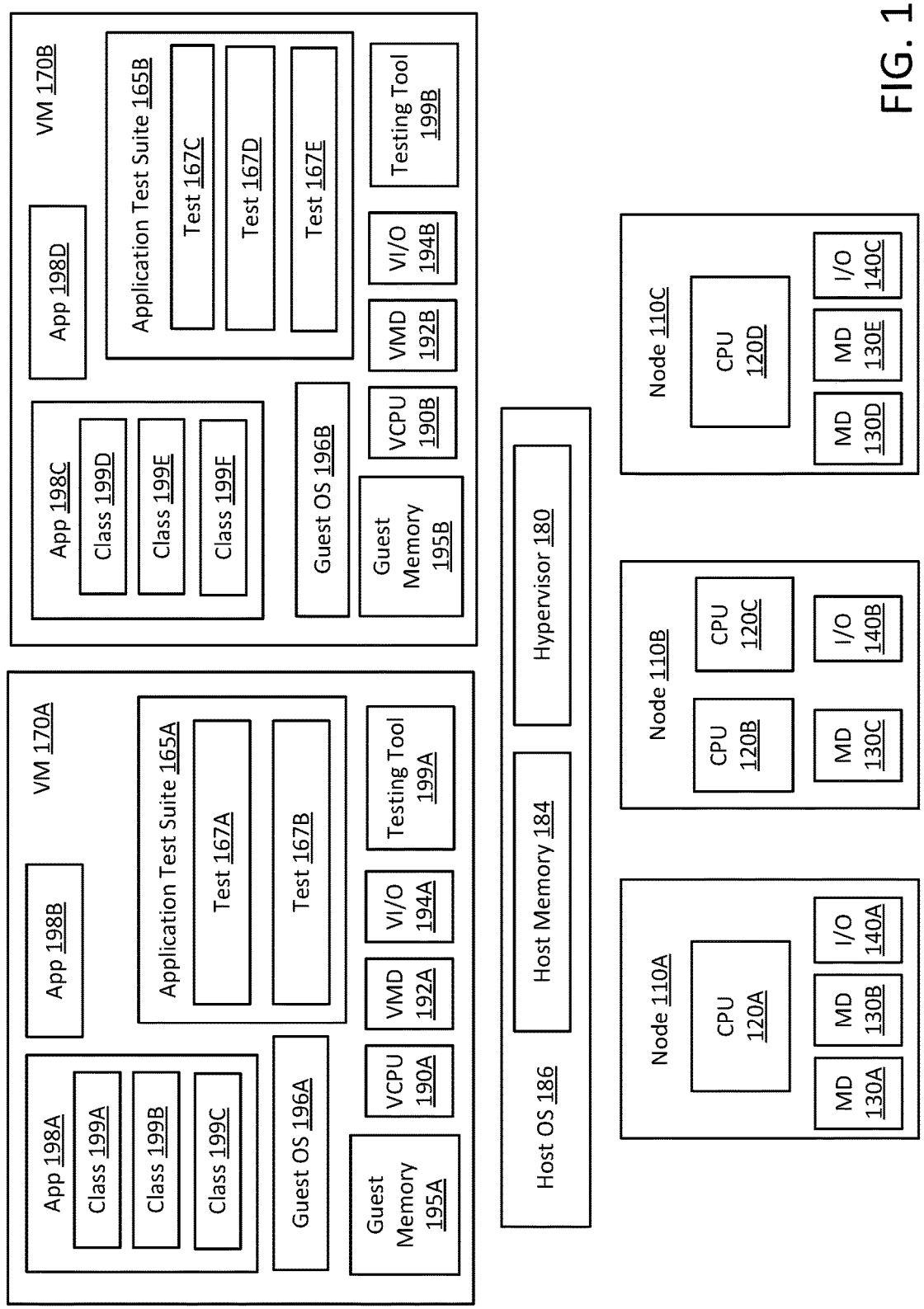
FIG. 1 illustrates a block diagram of an example computing system according to an example embodiment of the present disclosure.

Generally, when testing applications with an assortment of tests (e.g., unit tests, integration tests, etc.) each of the tests are run whenever a portion of an application, such as an application class, is modified. However, re-running or re-executing each test for the entire application can be time consuming and computationally expensive. Determining which application tests are relevant tests after an application is modified (e.g., when an application class is modified) is challenging as applications are often large and complex, such that tracking and determining dependency relationships becomes rather challenging and problematic. For example, some applications may include thousands of classes that are associated with application configurations or application run-times. The challenges described above are further augmented by integration style tests, where tests directly access HTTP endpoints or send messages because there may not be a direct link between a tested class and the functionality of the tested class that can be discovered by static code analysis.

Some existing solutions perform continuous testing for Java applications by statically analyzing references between classes. However, as noted above in some instances there may not be a direct link between classes that are discoverable by static analysis. Furthermore, statically analyzing references between classes has two major drawbacks. First, just because a class has a reference to another class—that does not necessarily mean that a given test actually uses that class. For example, if "class_A" includes "method_b( )" and "method_c( )", and "method_b( )" references another class (e.g., "class_D") while "method_c( )" does not, any test of "method_c( )" will typically be re-run if "class_D" changes, even though "method_c( )" does not directly use "class_D". In the example above, unnecessary tests may be re-run thereby prolonging testing, lengthening testing times, and consuming additional computation resources. Additionally, the solution described above typically only detects direct method invocations (i.e., unit testing), and if the test uses HTTP, the continuous testing approach is unable to determine which portions of code the HTTP request will invoke. Basically, the continuous testing approach described above is prone both to over-testing where unrelated tests are run (e.g., "class_D" example) and under-testing where tests that should be run are not (e.g., HTTP example).

In an effort to reduce (i) testing times and (ii) the consumption of computational resources while performing the application testing, the systems, methods and techniques disclosed herein implement a continuous testing approach that only executes relevant tests for particular application modifications. For example, when an application class is modified, only the relevant tests for that modification (e.g., modified class) are automatically run instead of re-running or re-executing each of the tests.

Specifically, as described in more detail below, the techniques disclosed herein solve the problems of existing testing solutions by instrumenting (i.e., transforming or modifying) each application class that a developer may modify such that use(s) of the class can be recorded during testing. Once the application classes are modified, the instrumentation maps which respective class(es) are used by which respective test(s). Then, when a developer modifies an application class, the mapped instrumentation data may be accessed to determine which tests touched certain classes (e.g., which respective class(es) are used by respective test(s)). The tests that touched any of the modified application class(es) are automatically re-run to give the application developer immediate feedback without having to run an entire test suite. Furthermore, the instrumentation data can be cached between test execution to avoid the need to run all the tests at startup.

FIG. 1 depicts a high-level component diagram of an example computing system 100 in accordance with one or more aspects of the present disclosure. The computing system 100 may include one or more virtual machines 170A-B, such as Java virtual machines (JVMs), a host OS 186 and nodes (e.g., nodes 110A-C). Virtual machines 170 may be provisioned on the same host or node (e.g., node 110A) or different nodes. For example, a VM 170A and another VM 170B may both be provisioned on node 110A. Alternatively, VM 170A may be provided on node 110A while VM 170B is provisioned on node 110B. In an example, the system 100 may include pods or containers (not pictured), but for illustrative purposes, the system is illustrated with virtual machines 170A-B.

The computing system may run applications (e.g., Apps 198A-D) or services, which may be provided via a server or cloud. The applications (e.g., Apps 198A-D) or services can be developed and deployed as a single unit or as multiple units. Applications 198A-D may run within virtual machines 170A-B. The virtual machines 170A-B may each run a process, service or application (e.g., applications 198A-D).

Each application may be associated with various application classes (e.g., class 199A-C). In the illustrated example, App 198A is associated with application classes 199A-C, but it should be appreciated that Apps 198B-D may also be associated with application classes. For example, App 198C is illustrated as being associated with application classes 199D-F. The applications may be associated with the same application classes 199A-C (referred to herein generally as application classes 199) or different application classes 199. The classes 199 may be class methods. The techniques disclosed herein may also apply to objects associated with an application which may include both methods and classes.

Additionally each virtual machine 170A-B or each application 198A-C may be associated with application tests. For example, VM 170A and/or Apps 198A-B are associated with application test suite 165A while VM 170B and/or Apps 198C-D are associated with application test suite 165B. The Application test suites 165A-B, hereinafter referred to generally as application test suite(s) 165, may include a plurality of tests 167A-E that make up an entire test suite 165. For example, test 167A and test 167B may make up an entire test suite (e.g., application test suite 165A) for VM 170A. Similarly, tests 167C-E may make up an entire test suite (e.g., application test suite 165B) for VM 170B.

As a test suite (e.g., test suite 165A) is executed, a testing tool (e.g., testing tool 199A-B) may execute, monitor and log tests results. The testing tool(s) 199A-B may identify and track which specific classes, methods or method parameters are touched (e.g., invoked, accessed, called or used) by various tests 167 of the application test suite (e.g., application test suite 165A).

As illustrated in FIG. 1, virtual machine 170A may include a virtual machine memory (VM Memory or Guest Memory 195A), a virtual CPU (VCPU 190A), virtual memory devices (VMD 192A), and virtual input/output devices (VI/O 194A). In an example, the virtual machine 170A may execute a guest operating system (guest OS 196A) and run applications (Apps 198A-B) which may utilize the underlying VCPU 190A, VMD 192A, and VI/O device 194A. As mentioned above, one or more applications 198A-B may be running on a virtual machine under the respective guest operating system 196A. A virtual machine may run on any type of dependent, independent, compatible, and/or incompatible applications on the underlying hardware and host operating system ("OS") 186. Additionally, applications 198A-B run on virtual machine 170A may be compatible with the underlying hardware and/or OS (e.g., Host OS 186). Similarly, virtual machine 170B may include a virtual machine memory (VM Memory or Guest Memory 195B), a virtual CPU (VCPU 190B), virtual memory devices (VMD 192B), and virtual input/output devices (VI/O 194B). In an example, the virtual machine 170B may execute a guest operating system (guest OS 196B) and run applications (Apps 198C-D) which may utilize the underlying VCPU 190B, VMD 192B, and VI/O device 194B As noted above, the computer system 100 may include one or more nodes 110A-C. Each node 110A-C may in turn include one or more physical processors (e.g., CPU 120A-D) communicatively coupled to memory devices (e.g., MD 130A-E) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D), generally referred to herein as processor(s) 120, may be interconnected using a variety of techniques, ranging from a point-to-point processor interconnect, to a system area network, such as an Ethernet-based network. Local connections within each node, including the connections between a processor 120A-D and a memory device 130A-E may be provided by one or more local buses of suitable architecture, for example, peripheral component interconnect (PCI).

The VMs 170A-B may be configured to perform continuous testing and dependency tracking to identify bugs or other issues with an application 198 as part of the development process (e.g., prior to a commercial or enterprise release or update). For example, a VM 170 (e.g., VM 170A) may be configured to instrument or modify application classes 199, such that usage of each application class can be tracked, monitored, mapped and/or recorded. Based on the test results, modifications and updates to the application 198 may be developed. By performing continuous testing as described above, the techniques disclosed herein determine which tests are "relevant tests" to re-run during each stage of application development, which reduces the likelihood of both over-testing and under-testing, which commonly plagues existing testing approaches. For example, over-testing may lengthen testing cycles and increase testing times. Furthermore, over-testing may waste computational resources by performing unnecessary tests or duplicating testing efforts. Conversely, under-testing may result in buggy applications being launched for commercial deployment because bugs or other application issues were undetected (e.g., the tests to uncover those issues or bugs were not executed). By reducing the likelihood of both over-testing and under-testing, continuous application testing may be performed more efficiently, with faster turn-around times and without wasting computational resources (e.g., computational resources used while executing unnecessary tests) while ensuring that the relevant parts of the application are tested to their full extent before a commercial or enterprise release.

Figure 2:
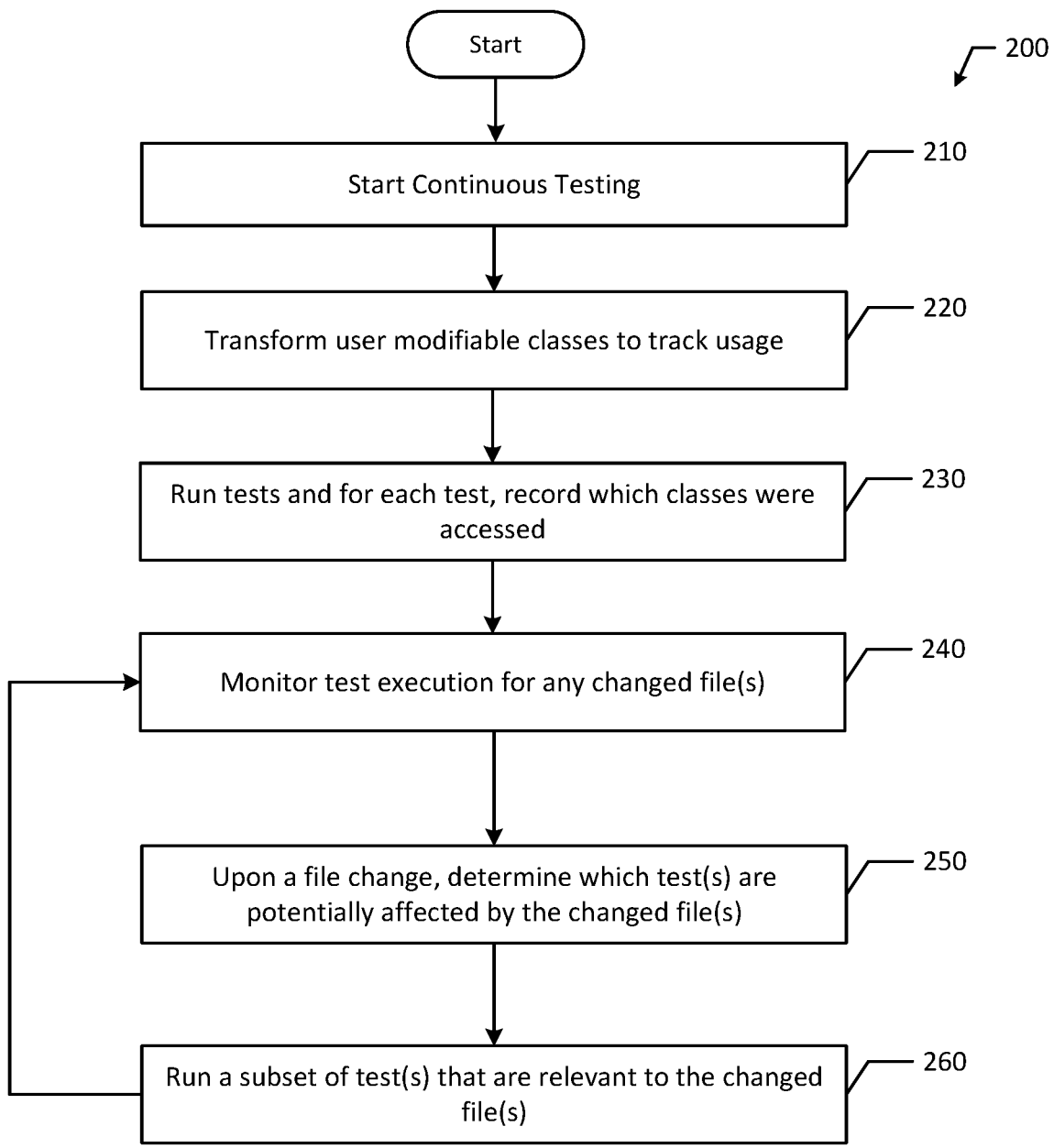
FIG. 2 illustrates a flowchart of an example process for continuous application testing according to an example embodiment of the present disclosure.

FIG. 2 illustrates a flowchart of an example method 200 for continuous application testing. While continuously testing an application, the method 200 may monitor or track dependencies. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting continuous testing (block 210). For example, continuous testing may be started as part of the development process (e.g., prior to publicly launching an application 198, rolling out the application 198 in an enterprise setting, a new version or updating the application 198). In an example, testing may be performed according to or in conjunction with unit testing, integration testing, Blue-Green deployment, or the like. Method 200 also includes transforming user modifiable classes (e.g., classes 199) such that the classes (e.g., classes 199) are adapted to track their usage (block 220). For example, the classes (e.g., classes 199) are transformed such that each of the respective classes 199 records usage (e.g., usage of the class or method) during testing. Specifically, after starting or initiating continuous testing, the user modifiable classes associated with an application may be modified to record their respective usage (e.g., the class may be associated with a methods and an event of calling the method may be recorded) during testing.

Then, method 200 includes running tests and for each test, recording which classes were accessed while running a respective test (block 230). For example, various tests making up an entire testing suite may be run to test the application 198. As discussed above with reference to FIG. 1, an application (e.g., App 198A) may comprise various application classes (e.g., class 199A-C), however some tests 167 may not touch, access or use some of the classes 199. In one example, the test suite may include test 167A and test 167B and during execution, test 167A may only touch, access or use class 199A and class 199B. Additionally, during execution, test 167B may only touch, access or use class 199C. During or after test execution (e.g., running the tests 167A-B), a record or log may be made to record which classes were accessed by which respective tests (e.g., classes 199A-B accessed by test 167A and class 199C accessed by test 167B). The method 200 also includes monitoring the text execution for any changed file(s) (block 240). For example, during testing, any changed file(s), such as application classes, may be monitored to determine if and what type of additional testing may be necessary.

Upon a file change, method 200 includes determining which test(s) are potentially affected by the changed file(s) (block 250). For example, if application class 199C is updated or changed (and as noted above only test 167B previously touched, accessed or used class 199C), then a determination may be made that test 167B is potentially affected by the changed file (e.g., class 199C). Conversely, if class 199B was modified or changed, then method 200 may determine that test 167A is potentially affected by the changed file.

Then, the method 200 includes running a subset of test(s) that are relevant to the changed file(s) (block 260). For example, if a developer changes application class 199C, then the method 200 may re-run a subset of tests 167A-B (e.g., only re-running test 167A). Conversely, if the developer makes a modification or change to application class 199B, then method 200 may re-run a subset of tests 167A-B (e.g., only re-running test 167B).

Figure 3:
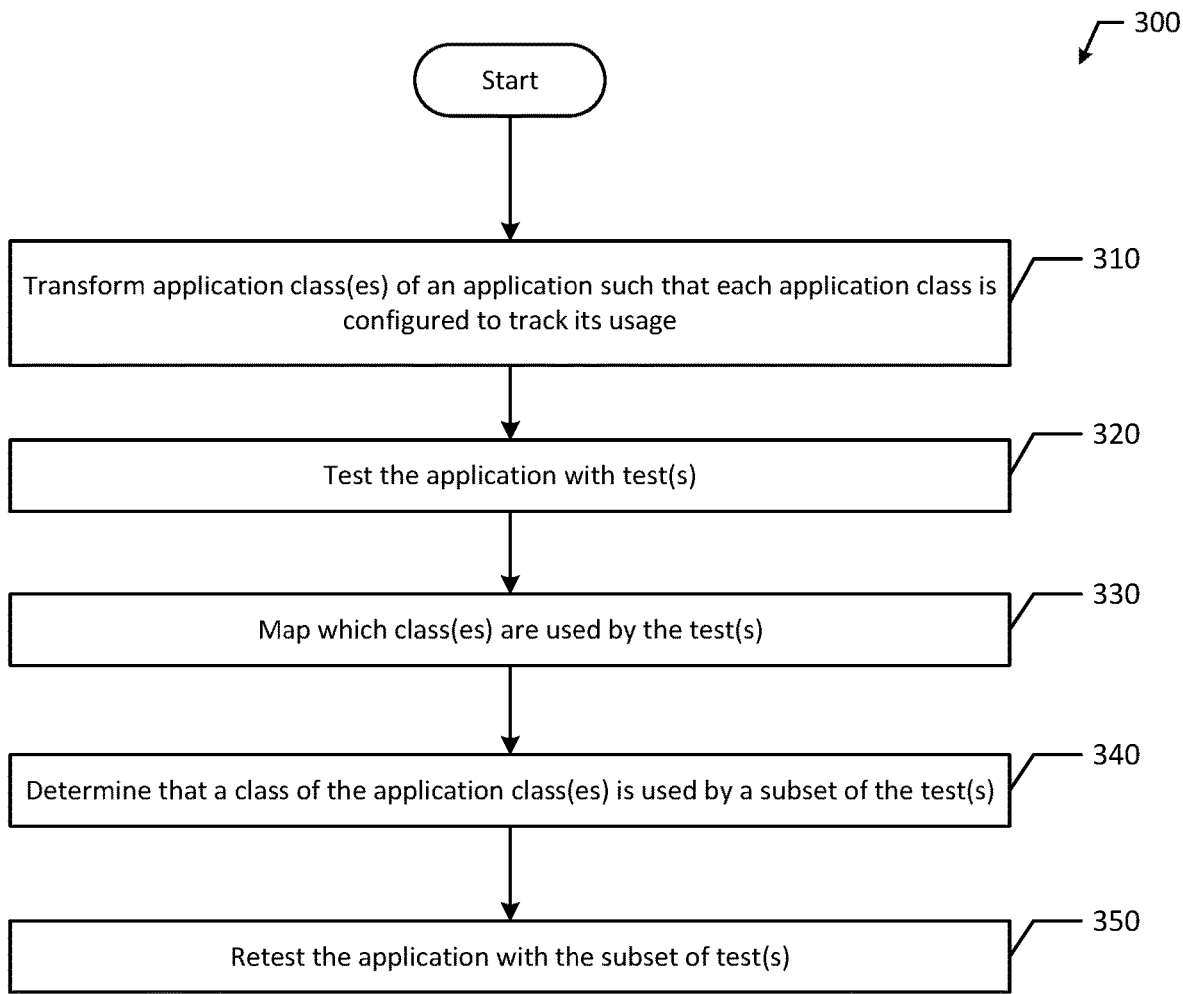
FIG. 3 illustrates a flowchart of an example process for continuous application testing according to an example embodiment of the present disclosure.

FIG. 3 illustrates a flowchart of an example method 300 for continuous application testing. While continuously testing an application, the method 300 may monitor or track dependencies. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes transforming application class(es) of an application such that each application class is configured to track its usage (block 310). For example, a plurality of application classes 199D-F may be transformed such that each respective class (e.g., class 199D) of the plurality of application classes 199D-F is configured to track usage of the respective application class (e.g., class 199D). Specifically, each application class (e.g., class 199D) may be configured to track instances when the application class (e.g., class 199D) is touched by, accessed by or used by a test (e.g., test 167C-E). In an example, a testing tool or a testing library, such as a Java Library may be used to transform the application classes 199D-F. It should be appreciated that each portion of method 300 may be performed by or performed via the testing tool or testing library (e.g., Java Library). The testing tool may be part of a Java Runtime Environment ("JRE") and may dynamically load application classes and execute tests in a JVM. The testing tool may be responsible for locating tests, other libraries, etc. and reading their contents to coordinate testing of the application. Alternatively other tools within the JVM environment may perform all or portions of method 300.

Then, method 300 includes testing the application with test(s) (block 320). In an example, method 300 may include testing the application 198C with the plurality of tests 167C-E. Additionally, method 300 includes mapping which class(es) are used by the tests (block 330). In an example, while testing the application 198C, the method 300 may include mapping which respective classes (e.g., class 199D and class 199E) of the plurality of application classes (e.g., classes 199E-F) are used by respective tests (e.g., tests 167C-E making up an application test suite 165B, which consists of the plurality of tests (e.g., application tests 167C-E).

Method 300 also includes determining that a class of the application class(es) is used by a subset of the test(s) (block 310). For example, the method 300 may determine that a first class (e.g., class 199D) of the plurality of application classes 199D-F is used by a subset of tests (e.g., test 167C and test 167D) of the plurality of application tests 167C-E making up application test suite 165B. In an example, the subset of tests (e.g., test 167C and test 167C) may include more than one test. For example, the application test suite 165B may include at least three tests 167C-D such that the subset of tests includes a first test (e.g., test 167C) and a second test (e.g., test 167D). It should be appreciated that the application test suites 165 may include more than three tests 167 or less than three tests 167.

Additionally, method 300 includes retesting the application with the subset of test(s) (block 350). For example, responsive to the first class (e.g., class 199D) of the plurality of application classes 199D-F being modified, the method 300 may include retesting the application 198C with the subset of tests (e.g., test 167C and test 167D) based on determining that the first class (e.g., class 199D) is used by the subset of tests 167C-D. By re-testing the application in such a way, method 300 advantageously conserves system resources (e.g., computational resources) by reducing the likelihood of over-testing while still performing a robust set of tests on the application as part of the development process (e.g., prior to a release, when integrating changes into a product).

Figure 4A:
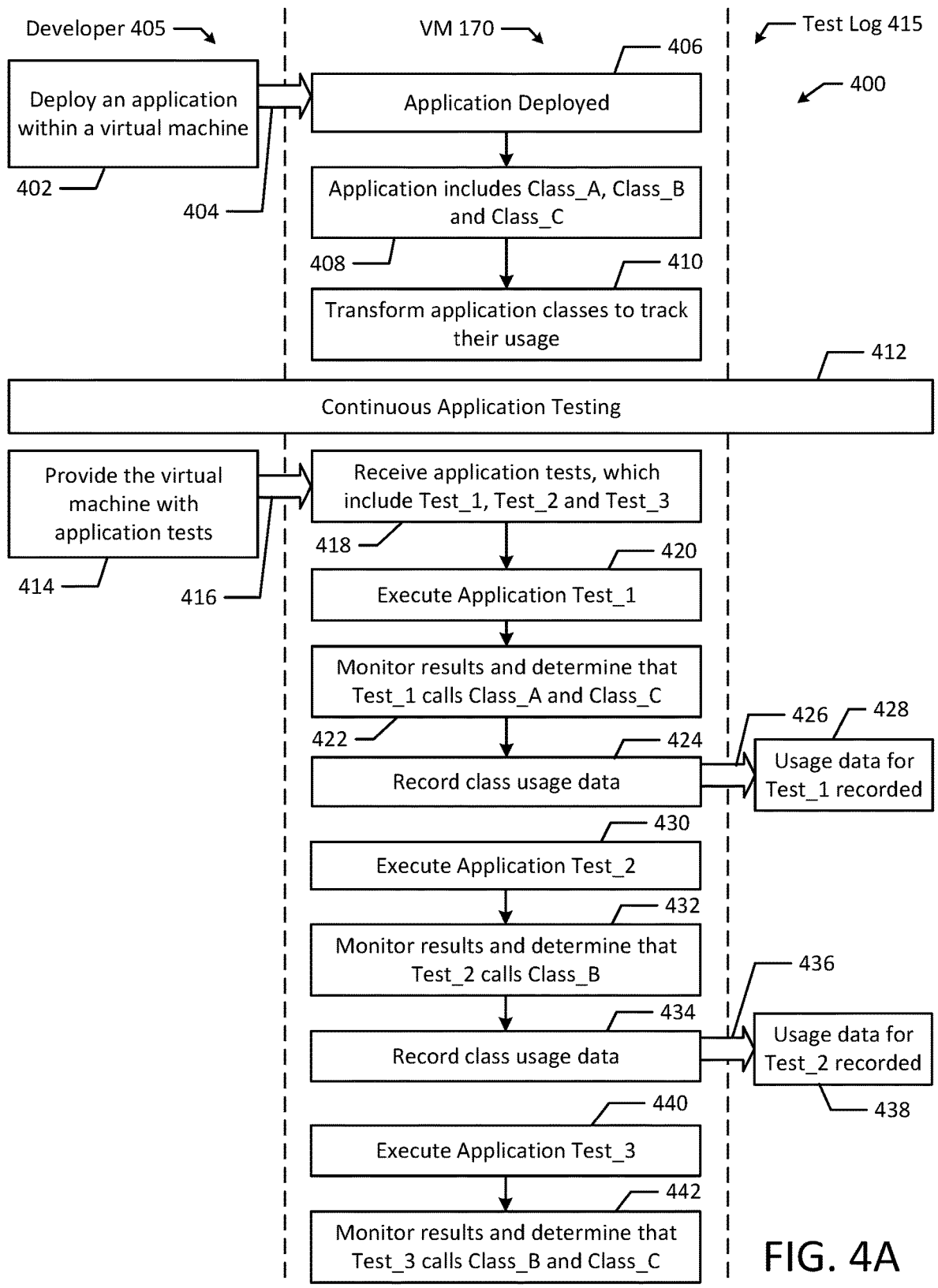
FIGS. 4A and 4B illustrate a flow diagram of an example process for application development, continuous application testing, and application release according to an example embodiment of the present disclosure.
Figure 4B:
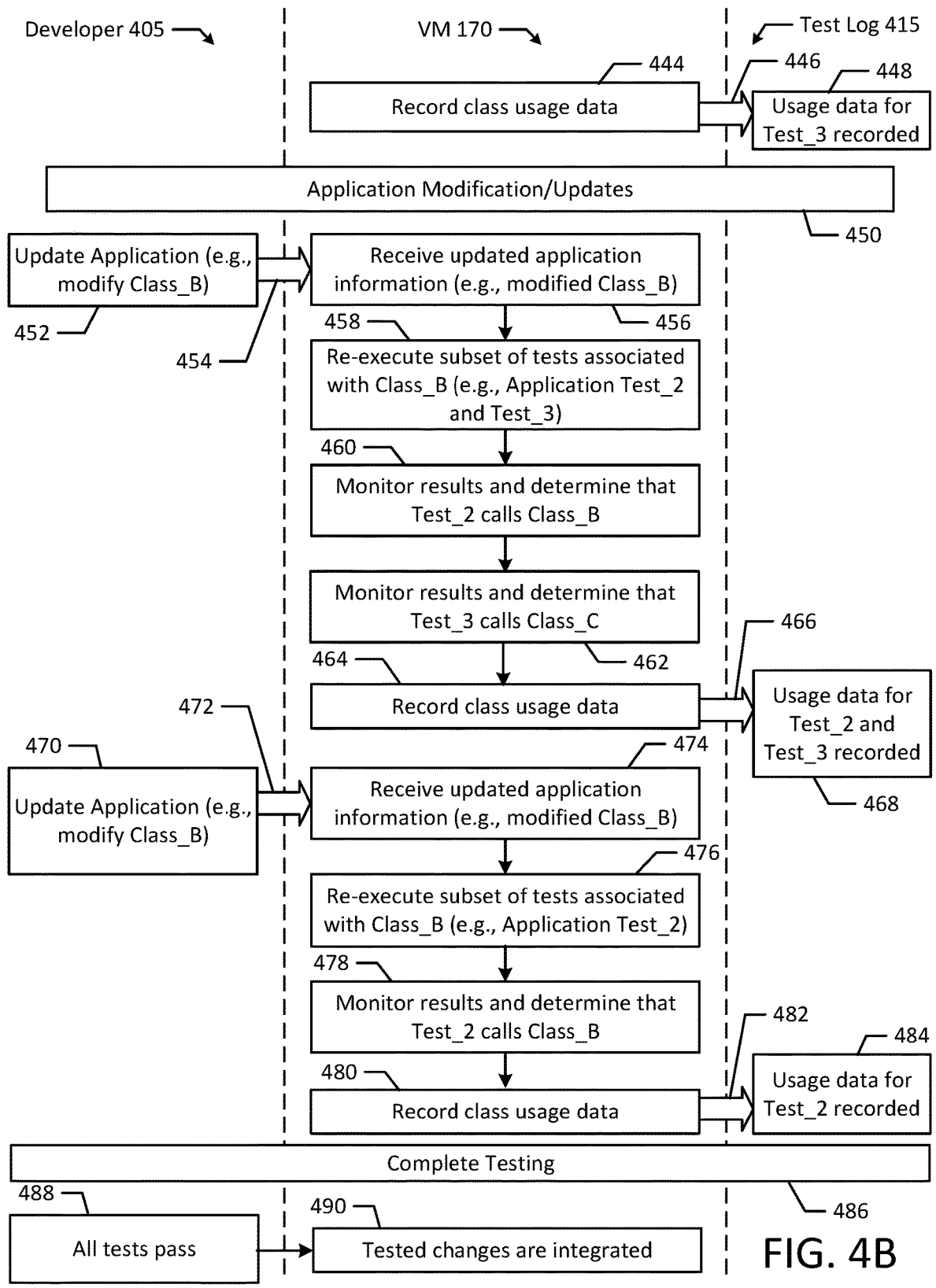

FIGS. 4A and 4B illustrate a flowchart of an example method 400 for an example process for application development, continuous application testing, and application release in accordance with an example embodiment of the present disclosure. Although the example method 400 is described with reference to the flowchart illustrated in FIGS. 4A and 4B it will be appreciated that many other methods of performing the acts associated with the method 400 may be used. For example, the order of some of the blocks may be changed, certain blocks may be combined with other blocks, blocks may be repeated, and some of the blocks described are optional. For example, a developer 405 may deploy and update applications on a virtual machine 170, which may create and/or communicate with a test log 415 to perform example method 400.

In the illustrated example, an application developer 405 may deploy an application 404 within a virtual machine 170 (block 402). The virtual machine 170 may be a Java virtual machine (JVM). Additionally, the application 404 may be deployed in a testing environment and in some instances, the JVM may be a virtual machine 170 that is configured to provide a testing environment. Then, the application 404 is deployed (block 406). As illustrated in FIG. 4A, the application 404 includes various classes such as "class_A", "class_B" and "class_C" (block 408). Then, the virtual machine 170 or a tool associated with the virtual machine 170 (e.g., a testing tool, which may include a testing library, such as a Java Library) transforms the application classes to track their usage during testing (block 410). For example, "class_A" is transformed or modified such that "class_A" is configured to track and record each time the class is accessed, touched by or used by a test during testing.

After the classes are transformed, continuous application testing may being (block 412). It should be appreciated that the application classes (e.g., "class_A", "class_B" and "class_C") may be preconfigured to track their respective usage without requiring additional transformation or modification. For testing, the developer 405 may provide the virtual machine 170 with application tests 416 (e.g., "test_1", "test_2" and "test_3") (block 414). Then, the virtual machine 170 receives the application tests 416, which includes "test_1", "test_2" and "test_3" (block 418). Even though the illustrated example includes only three application tests 416, an application test suite may include more than three tests.

During testing, the virtual machine 170 executes "test_1" (block 420). Additionally, the virtual machine 170 monitors results of the test execution and determines that "test_1" calls "class_A" and "class_C" (block 420). For example, the application classes (e.g., "class_A" and "class_C") which were transformed to track their usage are adapted to log or store data each time the class is used by a test (e.g., when "test_1" calls "class_A" and "class_C"). Then, the usage data 426 is recorded (block 424). The usage data 426 may be recorded by the application classes themselves as part of their transformed configuration. In another example, an application testing tool may monitor the usage data and record the data in a test log 415. In the illustrated example, the usage data 426 for "test_1" is recorded in the test log 415. In another example, usage data 426 may be recorded for each class. The usage data for "test_1" is recorded in the test log 415 (block 428). Regardless of the recording technique, the test log 415 may include a mapping that associates tests (e.g., "test_1") with application classes (e.g., "class_A" and "class_C").

Similarly, the virtual machine 170 executes "test 2" (block 430). Additionally, the virtual machine 170 monitors results of the test execution and determines that "test_2" calls "class_B" (block 432). For example, the application classes (e.g., "class_B") which was previously transformed to track its usage and is adapted to log or store data each time the class is used by a test (e.g., when "test_2" calls "class_B"). Then, the usage data 436 is recorded (block 434). The usage data 436 may be recorded by the application classes themselves as part of their transformed configuration. In another example, an application testing tool may monitor the usage data and record the data in a test log 415. In the illustrated example, the usage data 436 for "test_1" is recorded in the test log 415. In another example, usage data 436 may be recorded for each class. The usage data for "test_2" is recorded in the test log 415 (block 438). Regardless of the recording technique, the test log 415 may include a mapping that associates tests (e.g., "test_2") with application classes (e.g., "class_B").

Just like with "test_1" and "test_2", the virtual machine 170 executes "test_3" (block 440). Additionally, the virtual machine 170 monitors results of the test execution and determines that "test_3" calls "class_B" and "class_C" (block 442). Then, the virtual machine records class usage data 446 (block 444). Similar to usage data 426 and 436, the usage data 446 for "test_3" is recorded in the test log 415 (block 448). Now the test log 415 includes usage data that associates the following (i) "test_1" with "class_A" and "class_B"; (ii) "test_2" with "class_B"; and (iii) "test_3" with "class_B" and "class_C".

At some point during testing and application development, the developer 405 may update the application, for example by modifying "class_B" (block 452). For example, the previous round of testing may have indicated that there were issues with "class_B". In the illustrated example, the developer 405 may send the updated application information 454 (e.g., modified "class_B") to the virtual machine 170. Then, the virtual machine 170 receives the updated application information 454 (block 456). Upon receiving the updated application information 454 (e.g., modified "class_B"), a subset of the tests (e.g., "test_2" and "test_3"), which are specifically associated with "class_B" are re-executed by the virtual machine 170 (block 458). For example, based on the usage data in the test log 415, "test_2" and "test_3" may be automatically re-executed as the usage data indicates that "class_B" was used by those tests.

As tests are re-executed, the virtual machine 170 monitors results and now determines that "test_2" calls "class_B" and that "test_3" calls "class_C" (block 462). Looking back to block 442, previously "test_3" called both "class_B" and "class_C", but now that "class_B" has been modified, "test_3" only calls "class_C". The virtual machine 170, by way of a testing tool or based on class configurations, records updated usage data 446 (block 464). Then, the updated usage data 466 for "test_2" and "test_3" is recorded in the test log 415 (block 468). In some examples, the updated usage data 466 may replace existing usage data for the same tests. In other examples, the updated usage data 466 may be combined with the existing usage data. For example, if combined, "test_3" may still be associated with both "class_B" and "class_C". For example, the usage data may be compiled such that each instance of a class that was used by a test would remain associated with that test until the application was fully deployed. That way, any future updates to the application and an associated class may be tested by each test that—at one point in time—accessed the class to prevent under-testing.

At another point during testing and application development, the developer 405 may update the application again, for example by further modifying "class_B" (block 470). For example, the previous update may have introduced additional application bugs or may have failed to fix each of the bugs identified in the last round of testing. In the illustrated example, the developer 405 may send the updated application information 472 (e.g., modified "class_B") to the virtual machine 170. Then, the virtual machine 170 receives the updated application information 472 (block 474). Upon receiving the updated application information 472 (e.g., modified "class_B"), a subset of the tests (e.g., "test_2"), which are specifically associated with "class_B" are re-executed by the virtual machine 170 (block 476). Alternatively, as noted above, the subset of tests may include any test that accessed, toughed or used "class_B" throughout the development process, in which case the subset of tests would include "test_2" and "test_3".

The subset of tests may be automatically re-executed one the updated application information 472 is received by the virtual machine 170. The virtual machine 170 monitors the test results and determines that "test_2" calls "class_B" (block 478). Similar to recording processes described above, the virtual machine 170 records the class usage data 482 (block 480) and the class usage data 482 for "test_2" is recorded in the test log 415 (block 484). At this stage, the updated application data has fixed the remaining application bugs and the test suite reports the results of testing, which signifies the completion of testing (block 486).

For example, once testing is complete, the test suite reports that all tests pass (block 488) and the tested changes may be integrated into a product provided by the application (block 490). For example, the tested changes may be commercially deployed across various virtual machines, such as virtual machine 170. It should be appreciated that the environment for testing the application may a testing virtual machine 170, which may be different than a virtual machine 170 that the final enterprise version of the application is deployed on.

By performing continuous testing as described above, the techniques disclosed herein determine which tests are "relevant tests" to re-run during each stage of application development, which reduces the likelihood of both over-testing and under-testing, which commonly plagues existing testing approaches. Over-testing lengthens testing times and wastes computational resources by performing unnecessary tests and duplicating testing efforts. Conversely, under-testing may result in applications being launched for commercial deployment while inadvertently containing software bugs that may negatively affect application performance. By reducing the likelihood of both over-testing and under-testing, continuous application testing may be performed more efficiently, with faster turn-around times and without wasting computational resources (e.g., computational resources used while executing unnecessary tests) while ensuring that the relevant parts of the application are tested to their full extent before a commercial or enterprise release.

Figure 5:
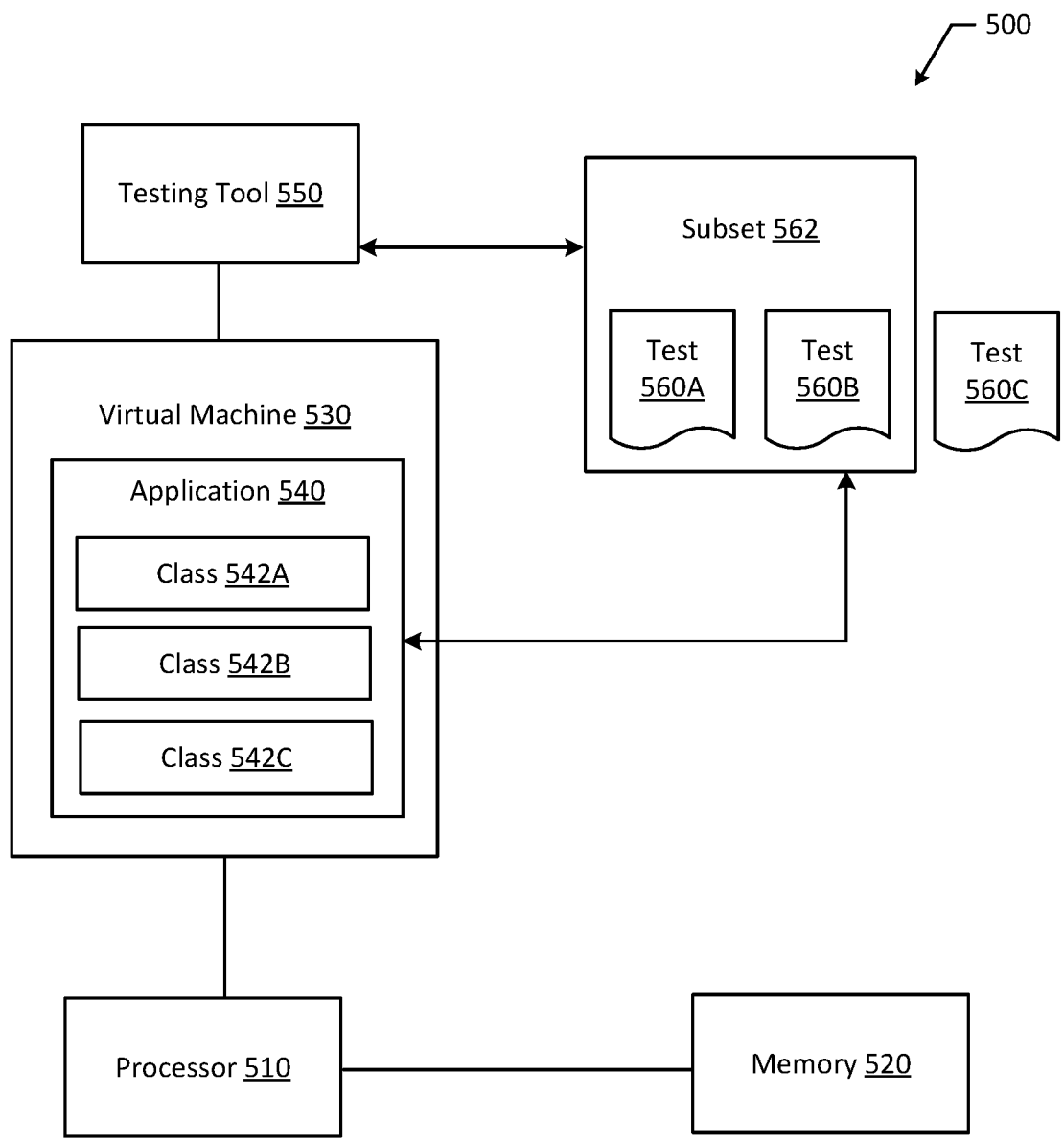
FIG. 5 illustrates a block diagram of an example continuous application testing system according to an example embodiment of the present disclosure.

FIG. 5 is a block diagram of an example continuous application testing system 500 according to an example embodiment of the present disclosure. The continuous application testing system 500 includes a processor 510 in communication with a memory 520, a virtual machine 530 running on the processor 510, and an application 540 executing within the virtual machine 530. The virtual machine 530 is associated with at least one testing tool 550, which may be configured to transform a plurality of application classes 542A-C of the application 540, such that each respective class (e.g., each of application classes 542A-C) of the plurality of application classes 542A-C is configured to track usage of the respective class (e.g., class 542A may be configured to track its own usage, for example the usage of class 542A).

The testing tool 550 may be further configured to test the application 540 with a plurality of tests 560A-C, and while testing the application 540, map which respective classes 542A-C of the plurality of application classes 542A-C are used by respective tests 560A-C of the plurality of tests 560A-C. Additionally, the testing tool 550 may be configured to determine that a first class (e.g., class 542A) of the plurality of application classes 542A-C is used by a subset 562 of tests (e.g., test 560A and test 560B) of the plurality of tests 560A-C. The subset 562 of tests (e.g., test 560A and test 560B) may include a first test (e.g., test 560A) and a second test (e.g., test 560B) of the plurality of tests 560A-C. Responsive to the first class (e.g., class 542A) of the plurality of application classes 542A-C being modified, the testing tool 550 may be configured to retest the application 540 with the subset 562 of tests (e.g., test 560A and test 560B) based on determining that the first class (e.g., class 542A) is used by the subset 562 of tests.

By performing continuous testing as described above, testing may be limited to "relevant tests", which are then re-run during each stage of application development, which reduces the likelihood of both over-testing and under-testing. By reducing the likelihood of both over-testing and under-testing, continuous application testing may be performed more efficiently, with faster turn-around times and without wasting computational resources (e.g., computational resources used while executing unnecessary tests) while ensuring that the relevant parts of the application are tested to their full extent before a commercial or enterprise release.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a processor in communication with a memory;
a virtual machine running on the processor; and
an application executing within the virtual machine, wherein the virtual machine is associated with at least one testing tool configured to:
transform a plurality of application classes of the application, such that each respective class of the plurality of application classes is configured to track usage of the respective class, each of which includes at least two methods, only one of which references a first class of the plurality of application classes, and each other method of the at least two methods not referencing the first class of the plurality of application classes, test the application with a plurality of tests which:
includes unrelated tests, and
directly accesses endpoints or sends messages,
while testing the application, map which respective classes of the plurality of application classes are used by respective tests of the plurality of tests, determine that the first class of the plurality of application classes is used by a subset of tests of the plurality of tests, wherein the subset of tests includes a first test and a second test of the plurality of tests and does not include tests of the each other method, and
responsive to the first class of the plurality of application classes being modified, retest the application with only the subset of tests based on determining that the first class is used by the subset of tests.

2. The system of claim 1, wherein the virtual machine is a Java virtual machine and the at least one testing tool includes a testing library, and wherein the testing library is a Java Library.

3. The system of claim 1, wherein the subset of tests is a first subset of tests and the at least one testing tool is further configured to: determine that a second class of the plurality of application classes is used by a second subset of tests of the plurality of tests, wherein the second subset of tests includes the first test and a third test of the plurality of tests; and responsive to the second class of the plurality of application classes being modified, retest the application with the second subset of tests based on determining the second class is used by the first test and the third test.

4. The system of claim 1, wherein tracking usage of the respective class includes recording any use of the respective class of the plurality of application classes.

5. The system of claim 1, wherein mapping which respective classes of the plurality of application classes are used by respective tests of the plurality of tests includes recording which respective classes were accessed for each test of the plurality of tests.

6. The system of claim 1, wherein the at least one testing tool is configured to retest the application with the respective subset of tests each time a respective class of the plurality of application classes is modified.

7. The system of claim 1, wherein the application includes a plurality of services and a first service of the plurality of services is a payment service, and wherein the plurality of tests includes a payment service test.

8. The system of claim 1, wherein transforming the plurality of application classes includes configuring each of the plurality of classes to perform a data store to record any usage of a method.

9. The system of claim 1, wherein the first class includes a first method and a second method, and wherein the second method references the second class.

10. A method comprising:
- transforming a plurality of application classes of an application, such that each respective class of the plurality of application classes is configured to track usage of the respective class, each of which includes at least two methods, only one of which references a first class of the plurality of application classes, and each other method of the at least two methods not referencing the first class of the plurality of application classes;
- testing the application with a plurality of tests which:
- includes unrelated tests, and
- directly accesses endpoints or sends messages;
- while testing the application, mapping which respective classes of the plurality of application classes are used by respective tests of the plurality of tests;
- determining that the first class of the plurality of application classes is used by a subset of tests of the plurality of tests, wherein the subset of tests includes a first test and a second test of the plurality of tests and does not include tests of the each other method; and
- responsive to the first class of the plurality of application classes being modified, retesting the application with only the subset of tests based on determining that the first class is used by the subset of tests.

11. The method of claim 10, wherein the subset of tests is a first subset of tests, the method further comprising: determining that a second class of the plurality of application classes is used by a second subset of tests of the plurality of tests, wherein the second subset of tests includes the first test and a third test of the plurality of tests; and responsive to the second class of the plurality of application classes being modified, retesting the application with the second subset of tests based on determining the second class is used by the first test and the third test.

12. The method of claim 10, wherein tracking usage of the respective class includes recording any use of the respective class of the plurality of application classes.

13. The method of claim 10, wherein mapping which respective classes of the plurality of application classes are used by respective tests of the plurality of tests includes recording which respective classes were accessed for each test of the plurality of tests.

14. The method of claim 10, further comprising retesting the application each time a respective class of the plurality of application classes is modified.

15. The method of claim 10, wherein the application includes a plurality of services and one service of the plurality of services is a payment service, and wherein the plurality of tests includes a payment service test.

16. The method of claim 10, wherein transforming the plurality of application classes includes configuring each of the plurality of classes to perform a data store to record any usage of a method.

17. The method of claim 10, wherein the application is a Java application and a testing tool transforms the application classes, wherein the testing tool is a testing library.

18. A non-transitory machine-readable medium storing code, which when executed by a processor is configured to:
- transform a plurality of application classes of an application, such that each respective class of the plurality of application classes is configured to track usage of the respective class, each of which includes at least two methods, only one of which references a first class of the plurality of application classes, and each other method of the at least two methods not referencing the first class of the plurality of application classes;
- test the application with a plurality of tests which:
- includes unrelated tests, and
- directly accesses endpoints or sends messages;
- while testing the application, map which respective classes of the plurality of application classes are used by respective tests of the plurality of tests; determine that the first class of the plurality of application classes is used by a subset of tests of the plurality of tests, wherein the subset of tests includes a first test and a second test of the plurality of tests and does not include tests of the each other method; and
- responsive to the first class of the plurality of application classes being modified, retest the application with only the subset of tests based on determining that the first class is used by the subset of tests.

19. The non-transitory machine-readable medium of claim 18, wherein mapping which respective classes of the plurality of application classes are used by respective tests of the plurality of tests includes recording which respective classes were accessed for each test of the plurality of tests.

20. The non-transitory machine-readable medium of claim 18, which is further configured to retest the application each time a respective class of the plurality of application classes is modified.

* * * * *